United States Patent
Anghel et al.

(10) Patent No.: US 12,328,028 B2
(45) Date of Patent: Jun. 10, 2025

(54) ENERGY MANAGEMENT OF HYBRID ELECTRICAL SYSTEMS

(71) Applicant: Honeywell International Inc., Charlotte, NC (US)

(72) Inventors: Cristian E. Anghel, Tucson, AZ (US); Davendar Kashireddy, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 39 days.

(21) Appl. No.: 18/051,794

(22) Filed: Nov. 1, 2022

(65) Prior Publication Data
US 2024/0072566 A1 Feb. 29, 2024

(30) Foreign Application Priority Data
Aug. 25, 2022 (IN) .............................. 202211048553

(51) Int. Cl.
*H02J 7/14* (2006.01)
*H02J 7/00* (2006.01)

(52) U.S. Cl.
CPC .......... *H02J 7/1438* (2013.01); *H02J 7/0048* (2020.01); *H02J 7/0068* (2013.01); *H02J 7/007182* (2020.01)

(58) Field of Classification Search
CPC .. H02J 7/1438; H02J 7/0048; H02J 7/007182; H02J 7/0068
See application file for complete search history.

(56) References Cited

U.S. PATENT DOCUMENTS

| | | | |
|---|---|---|---|
| 4,044,296 A | 8/1977 | Dhyanchand et al. | |
| 4,081,740 A | 3/1978 | Teratani et al. | |
| 4,293,811 A | 10/1981 | Muto et al. | |
| 5,973,482 A | 10/1999 | Meinert | |

(Continued)

FOREIGN PATENT DOCUMENTS

| | | |
|---|---|---|
| CN | 205304664 U | 6/2016 |
| CN | 108649844 A | 10/2018 |

(Continued)

OTHER PUBLICATIONS

U.S. Patent and Trademark Office, "Notice of Allowance", U.S. Appl. No. 17/586,512, filed May 12, 2023, pp. 1 through 20, Published: US.

(Continued)

*Primary Examiner* — Jared Fureman
*Assistant Examiner* — Duc M Pham
(74) *Attorney, Agent, or Firm* — Fogg & Powers LLC

(57) ABSTRACT

Systems and methods for energy management of hybrid electrical systems are discussed herein. In certain embodiments, a system includes one or more generators configured to provide generator electric power. The system also includes one or more batteries configured to provide stored electric power. Further, the system includes one or more generator controllers using a state of charge for the one or more batteries, wherein the one or more generator controllers control a combination of the generator electric power and the stored electric power provided to one or more loads according to a plurality of modes, wherein multiple modes of the plurality of modes are based on one or more parameters of the one or more batteries.

20 Claims, 8 Drawing Sheets

(56) References Cited

U.S. PATENT DOCUMENTS

| | | |
|---|---|---|
| 7,193,395 B2 | 3/2007 | O'Gorman et al. |
| 7,271,570 B2 | 9/2007 | O'Gorman et al. |
| 7,433,211 B1 | 10/2008 | Collmeyer et al. |
| 7,548,438 B1 | 6/2009 | Collmeyer et al. |
| 7,554,821 B1 | 6/2009 | Collmeyer et al. |
| 7,680,613 B2 | 3/2010 | Lim et al. |
| 7,888,925 B2 | 2/2011 | Dequina |
| 7,990,085 B2 | 8/2011 | Furukawa et al. |
| 8,217,631 B2 | 7/2012 | Owens, Jr. et al. |
| 8,294,429 B2 | 10/2012 | Fuller et al. |
| 9,660,563 B2 | 5/2017 | Rozman et al. |
| 10,099,794 B2 | 10/2018 | Bak et al. |
| 10,320,314 B2 | 6/2019 | Fox et al. |
| 10,583,929 B2 | 3/2020 | Ozaki |
| 10,903,743 B2 | 1/2021 | Lynch et al. |
| 11,183,941 B2 | 11/2021 | Schmitt |
| 11,277,127 B1 | 3/2022 | Mantooth et al. |
| 2004/0263131 A1 | 12/2004 | Suelzle et al. |
| 2006/0038540 A1 | 2/2006 | O'Gorman et al. |
| 2006/0164046 A1 | 7/2006 | O'Gorman et al. |
| 2007/0068714 A1 | 3/2007 | Bender |
| 2008/0224663 A1* | 9/2008 | Mack ................... B60W 20/15 320/132 |
| 2009/0027024 A1 | 1/2009 | Dequina |
| 2009/0174188 A1 | 7/2009 | Huang et al. |
| 2009/0295333 A1 | 12/2009 | Ryu |
| 2011/0133703 A1 | 6/2011 | Rozman et al. |
| 2012/0106007 A1 | 5/2012 | Beneditz |
| 2018/0233943 A1* | 8/2018 | Koizumi ................ B60L 7/18 |
| 2018/0281773 A1* | 10/2018 | Bell ..................... B60W 10/08 |
| 2018/0291807 A1 | 10/2018 | Dalal |
| 2018/0316295 A1 | 11/2018 | Eakman |
| 2019/0308573 A1* | 10/2019 | Itou ........................ B60R 16/03 |
| 2020/0227913 A1 | 7/2020 | Lynch et al. |
| 2022/0231615 A1 | 7/2022 | Bando et al. |
| 2023/0108847 A1 | 4/2023 | Sakawaki et al. |
| 2023/0126186 A1 | 4/2023 | Anghel et al. |

FOREIGN PATENT DOCUMENTS

| | | |
|---|---|---|
| CN | 108566129 B | 6/2021 |
| EP | 2131487 B1 | 7/2014 |
| EP | 3623203 A1 | 3/2020 |
| EP | 3703220 A1 | 9/2020 |
| EP | 3772816 A1 | 2/2021 |
| JP | 7072414 B2 | 5/2022 |

OTHER PUBLICATIONS

European Patent Office, "Extended European Search Report", from EP Application No. 22202992.8, from Foreign Counterpart to U.S. Appl. No. 17/586,512, filed Mar. 17, 2023, pp. 1 through 13, Published: EP.

Noland et al., "Excitation System Technologies for Wound-Filed Synchronous Machines: Survey of Solutions and Evolving Trends", IEEE Access, vol. 7, Aug. 21, 2019, pp. 109699 through 109718.

European Patent Office, "Extended European Search Report", dated Dec. 19, 2023, from EP Application No. 23190285.9, from Foreign Counterpart to U.S. Appl. No. 18/051,794, pp. 1 through 8, Published: EP.

* cited by examiner

ENERGY MANAGEMENT OF HYBRID ELECTRICAL SYSTEMS

CROSS-REFERENCE TO RELATED APPLICATIONS

This application claims priority to Indian Provisional Application No. 202211048553 filed on Aug. 25, 2022, and titled "ENERGY MANAGEMENT OF HYBRID ELECTRICAL SYSTEMS," the contents of which are incorporated herein in their entirety.

BACKGROUND

Some systems require high electrical power to operate correctly. Some vehicles have propulsion systems that use high electrical power to propel the movement of the vehicles. Hybrid electric propulsion systems have been designed to meet the power needs for driving the movement of these vehicles. As used herein, a hybrid electric propulsion system may be a system that uses multiple sources of electrical power to provide the needed power. For example, a hybrid electric propulsion system may provide power from both an electric generation system and an energy storage system.

In some embodiments of hybrid electric propulsion systems, the electric generation system may generate power using a prime mover connected to a generator. The prime mover provides the motive force for the generator. For example, the prime mover may be a turbine, diesel engine, Wankel engine, or some other type of engine or motive force. The generator generates electrical power that is then used by the vehicle to propel the motion of the vehicle. In addition to the electric generation system, the energy storage system may also provide electrical power for the propulsion of the vehicle. The energy storage system may include a battery system that stores electrical power for use by the vehicle. In addition to the battery system, the energy storage system may include a battery charger for charging the battery system.

SUMMARY

Systems and methods for energy management of hybrid electrical systems are discussed herein. In certain embodiments, a system includes one or more generators configured to provide generator electric power. The system also includes one or more batteries configured to provide stored electric power. Further, the system includes one or more generator controllers using a state of charge for the one or more batteries, wherein the one or more generator controllers control a combination of the generator electric power and the stored electric power provided to one or more loads according to a plurality of modes, wherein multiple modes of the plurality of modes are based on one or more parameters of the one or more batteries.

DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

Figure 1:
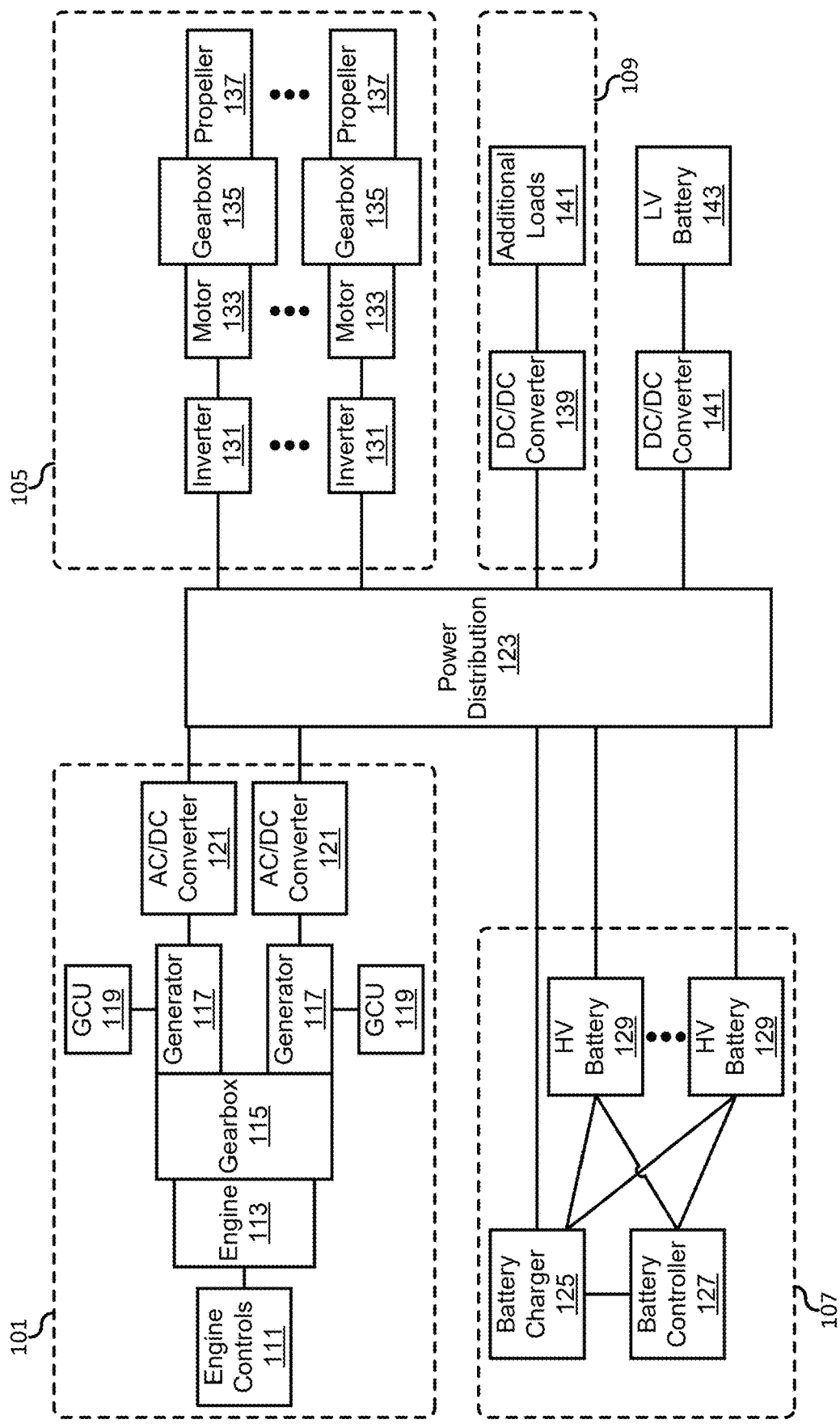
FIG. 1 is a block diagram of a typical hybrid electrical system.

Per common practice, the drawings do not show the various described features according to scale, but the drawings show the features to emphasize the relevance of the features to the example embodiments.

DETAILED DESCRIPTION

The following detailed description refers to the accompanying drawings that form a part of the present specification. The drawings, through illustration, show specific illustrative embodiments. However, it is to be understood that other embodiments may be used and that logical, mechanical, and electrical changes may be made.

Embodiments described herein provide systems and methods for energy management in a hybrid electrical system having an electrical generation system and an energy storage system. In certain embodiments, a hybrid electrical system includes a controller that monitors the state of an energy storage system and manages the power output of the electrical generation system to keep the energy storage system at a desired operating state while improving the ability of the system to handle transient power needs by a connected load. Additionally, the controller may direct the electrical generation system to produce additional power beyond the power used by the loads, where the additional power is used to charge the energy storage system. Thus, the system can charge the energy storage system (like a battery) without using an expensive and complex separate charging device.

In exemplary embodiments, the controller identifies a present operation mode for the hybrid electrical system based on the state of the energy storage system. Based on the identified modes, the controller directs the operation of the hybrid electrical system. In particular, the controller directs the amount of energy provided by the electrical generation system and the energy storage system. Potential operation modes may include at least one of a startup mode, a normal operation mode, a low-charge mode, and a high-charge mode.

In certain embodiments, the startup mode occurs when the hybrid electrical system begins operation or when the hybrid electrical system transitions from a loaded-steady state to a no-load/light load state. In this mode, the hybrid electrical system will begin providing power when the generator is ready to provide the power and the controller may regulate the AC voltage produced by a generator by taking battery voltage as a reference. When the generator HVDC voltage (rectified generator AC voltage) reaches the battery voltage, an HVDC contactor is closed. The closing of the HVDC contactor may reduce an inrush current to the battery. When the controller detects the no-load/light-load during a voltage buildup or steady-state operation or load transient, the controller may regulate the generator AC voltage to a battery HVDC voltage with an AC POR voltage regulation method.

Further, the controller may direct the hybrid electrical system to operate in a normal operation mode based on the parameters of the energy storage system. For example, the controller may monitor or calculate the state of charge (SOC) for one or more batteries of the energy storage system. When the SOC is within a specified range, the controller directs the hybrid electrical system to operate in a normal operation mode. In the normal operation mode, the controller may cause the electrical generation system to respond to the load changes in such a way to reduce the undesired effects of load transients on the electrical generation system. Typically, the electrical generation system responds slower to load changes than a system without energy storage, since the energy storage provides the energy required by the load at the beginning of the transient. For example, the controller may regulate the excitation of the electrical generation system by monitoring the power needs of the loads and applying a smoothing algorithm to the power needs of the loads, such that the electrical generation system does not respond to high-frequency changes in the power needs of the loads. Accordingly, when a high-frequency change causes the loads to need more power than what is currently being provided by the electrical generation system, the loads may draw the needed additional power from the batteries. Conversely, when a high-frequency change causes the loads to need less power than what is currently being provided by the electrical generation system, the additional power provided by the electrical generation system may charge the batteries. Thus, within the normal operation mode, high-frequency changes in the power needs of the loads may cause the energy storage system to switch between being charged and discharged, causing the SOC to stay within the normal operation mode without a battery charger and allowing the electrical generation system to be more resilient to load transients.

In exemplary embodiments, when the controller determines that the energy storage system is in a low SOC, the controller may direct the hybrid electrical system to operate in a low-charge mode. In a low-charge mode, the controller may disconnect or not allow the energy storage system to provide power to the loads and direct the electrical generation system to provide charging power in addition to the power drawn by the load. At times the power needs of the loads may exceed the power limit of the electrical generation system. In such a circumstance, the controller may disconnect the battery from providing power to the loads and the electrical generation system operates in a power-limited mode. When the power needs of the loads fall below the power limit of the electrical generation system the controller may reconnect the battery to the loads and electrical generation system. Thus, during the low-charge mode, the controller is able to direct the electrical generation system to provide additional power for charging the energy storage system until the SOC indicates that the hybrid electrical system should operate in the normal operation mode.

In additional embodiments, when the controller determines that the energy storage system is in a high SOC, the controller may direct the hybrid electrical system to operate in a high-charge mode. In a high-charge mode, the controller directs the energy storage system to continuously discharge power at a set power level in addition to the power produced by the electrical generation system to meet the power needs of the loads. Thus, the energy storage system may discharge continuously until the SOC indicates that the hybrid electrical system should operate in the normal operation mode.

By identifying different modes of operation for the hybrid electrical system based on the SOC of the energy storage system, a controller may direct the electrical generation system to provide additional power that can be used to charge the energy storage system. Accordingly, a hybrid electrical system that functions according to the systems and methods described herein may charge the energy storage system without including a dedicated charging system for the energy storage system. Dedicated charging systems add weight, complexity, and cost to hybrid electrical systems while also reducing the reliability of the hybrid electrical system. Thus, as the systems and methods described herein remove the need for a dedicated charging system, the hybrid electrical system can weigh less, cost less, have less complexity, and have better reliability.

Additionally, by controlling the operation of the hybrid electrical system based on the identified modes, the controller may reduce the sensitivity of the electrical generation system to electric load transients. As known to one having skill in the art, electric load transients arise when electrical loads are suddenly applied or removed. When the electrical generation system is a generator, the electrical load transients are experienced as sudden increases in the torque on a prime mover of the generator. These large torque requirement transients can cause unstable operation of the prime mover and may even shut down the operation of the prime mover. As the controller described herein is able to smooth the operation of the electrical generation system in response to electrical load transients when operating in the normal mode, the systems and methods described herein reduce the sensitivity of the hybrid electrical system to electrical load transients.

FIG. 1 is a block diagram of a system 100 implementing a hybrid electrical system. As discussed above, a hybrid electrical system may include an energy storage system 107 and an electrical generation system 101. The system 100 includes a power distribution system 123 for distributing the power produced by the electrical generation system 101 and the energy storage system 107 to both each other and to one or more loads. As illustrated, the loads may include a propulsion system 105, additional loads 141, and other lower voltage storage systems, like a low-voltage battery 145.

In certain embodiments, the electrical generation system 101 may produce power using one or more generators 117. The electrical generation system 101 may include components for driving the movement of the one or more generators 117, regulating the operation of the one or more generators 117, and converting the generated power for use by various connected loads. While the electrical generation system 101 is described herein in connection with electronic propulsion systems, the electrical generation system 101 may operate as a general electrical generation system within different applications. for example, the electrical generation system 101 may operate as a starter-generator for a gas turbine engine in aircraft, space, marine, land, or other stationary applications that may use power generation.

In some embodiments, the electrical generation system 101 may include an engine 113 that functions as a prime mover for the one or more generators 117. As used herein, the term prime mover may refer to the prime motive force that drives the motion of the one or more generators 117. When the engine 113 functions as the prime mover, the engine may be a turbine, diesel engine, Wankel engine, or another type of engine. Additionally, the prime mover may be a non-engine motive force. In some embodiments, the electrical generation system 101 may also include engine controls 111 for controlling the operation of the engine. In some embodiments, the engine controls 111 may be part of a controller for the operation of the generators 117. Alternatively, the engine controls 111 may operate as separate controls from the controls for the one or more generators 117. In some implementations, the engine controls 111 may be manually operated. When the electrical generation system 101 operates, the engine controls 111 may direct the engine 113 to drive a shaft that causes the one or more generators 117 to rotate. In some embodiments, the shaft may rotate a rotor of a permanent magnet generator (PMG), an exciter rotor, and a main generator rotor. The engine may drive the shaft rotation along a single axis or along separate axes for the different components of the engine 113 at a specific or variable rotational speed.

In some embodiments, the electrical generation system 101 may include a gearbox 115 that functions as a transmission that causes the generator rotor to rotate at a different rate than the engine shaft. In some implementations, the gearbox 115 may be a controllable transmission that directs the gearbox 115 to rotate at multiple different ratios when compared to the rotation of the drive shaft of the engine 113.

In certain embodiments, to control the operation of the generator, the electrical generation system 101 may include one or more generator control units 119. The generator control units (GCUs) 119 may control the operation of the generators 117 by monitoring the power provided by the electrical generation system 101. As illustrated, the electrical generation system 101 includes two GCUs 119 and two generators 117. However, the electrical generation system 101 may include one GCU 119 that controls multiple generators 117, multiple GCUs 119 associated with a specific generator 117, or other combinations of GCUs 119 and generators 117.

During operation, the GCUs 119 may control the operation of the generators 117 based on the AC voltage produced by the generators 117. For example, the GCUs 119 may monitor the voltage and current generated by the generators 117. The GCUs 119 may regulate the AC voltage produced by the generators 117 at a constant value when subjected to one or more loads or speed variations. When regulating the AC voltage, the GCUs 119 may measure the voltages and currents at an AC point of regulation (POR), which may be at the output of the respective generator 117. The GCUs 119 may control excitation voltages for the generators 117 based on the measurements at the AC POR. Additionally, the GCUs 119 may control the gearbox 115 to configure the ratio of revolutions of the generator to the revolution of the shaft connected to the prime mover.

In typical embodiments, one or more AC/DC converters 121 may convert the AC voltage, generated by generators 117, into a DC voltage. For example, some typical systems may generate HVDC with a three-phase AC generator (such as the generator system) with diode rectifiers. Other typical systems may generate HVDC with a multi-phase AC generator and diode rectifiers. Thus, when the one or more generators 117 produce power, the electrical generation system 101 may couple the generated AC power to one or more AC/DC converters 121. The AC/DC converters 121 may include rectifiers that receive the AC power and convert the AC power to DC power. The electrical generation system 101 then provides the converted DC power to a power distribution system 103 for distribution to one or more loads.

As described above, the hybrid electrical system 100 may include an energy storage system 107. The energy storage system 107 may be a system of energy storage devices that provide power to the one or more loads in addition to the power provided by the power generation system 101. As shown in FIG. 1, the energy storage system 107 may store electrical energy on one or more high voltage batteries 129. While the energy storage system 107 is shown as storing the energy on high voltage batteries 129, the energy storage system 107 may use other energy storage devices such as low voltage batteries, supercapacitors, and the like.

In the typical energy storage system 107, to recharge the energy storage devices (such as the HV batteries 129), the energy storage system 107 may include a battery charger 125. The battery charger 125 may acquire power from the electrical generation system 101 through the power distribution system 123. Further, the energy storage system 107 may further include a battery controller 127 that controls the operation of the one or more high voltage batteries 129 and the battery charger 127. For example, the battery controller 127 may monitor the SOC of the one or more high voltage batteries 129. When the SOC is below a threshold level, the battery controller 127 may disconnect the one or more high voltage batteries 129 from the power distribution system 123 and direct the battery charger 125 to draw power produced by the electrical generation system 101 to charge the one or more high voltage batteries 129.

In certain embodiments, the power provided by the electrical generation system 101 and the energy storage system 107 is distributed to one or more loads through a power distribution system 123. The power distribution system 123 may distribute the power to AC loads 105, DC loads 109, and additional energy storage (such as one or more low voltage batteries 145).

In some implementations, the AC loads 105 may include a propulsion system. As used herein, a propulsion system is a system that converts electrical power into mechanical power for propelling the motion of a vehicle. Specifically, as shown, the propulsion system may convert AC power into mechanical power. As the AC loads 105 receive DC power from the power distribution system 123, the AC loads 105 may additionally include one or more inverters 131 that convert the received DC power into AC power. The received AC power produced from the one or more inverters 131 may be provided to one or more motors 133. The motors 133 may be electrical motors that receive the AC power and drive the rotation of a shaft or motion of another object. When the motors 133 rotate a shaft, the rotation of the shaft may be coupled to provide rotational force to one or more propellers 137. The rotation of the propellers 137 may drive the motion of a vehicle. While propellers 137 are shown, the rotation may also be coupled to drive wheels, tracks, or other similar devices. In some implementations, the propellers 137 may be coupled to the respective motors 133 through one or more interceding gearboxes 135. A gearbox 135 may function in a similar manner to the gearbox 115, where the gearbox 135 allows the propellers 137 to rotate at a different rate from the motors 133.

In addition to the AC loads 105, the power may be provided to one or more DC loads 109. The DC loads 109 may include additional loads 141 that are driven by DC power. While the electrical generation system 101 and the energy storage system 107 provide DC power, the electrical generation system 101 and the energy storage system 107 generally provide DC power at voltages that are too high for use by the DC loads 109. Accordingly, the DC loads 109 may include one or more DC/DC converters 139 that convert high voltage DC power received from the power distribution system 123 into lower voltage DC power for use by the additional loads 141. Further, the system 100 may include one or more low-voltage batteries 145 that also receive electrical power from the power distribution system 123. In a similar manner to the additional loads 141, the low-voltage batteries 145 may receive lower voltage DC power from a DC/DC converter 143 that converts the high voltage DC power from the power distribution system 123 into a low voltage for storage on the low-voltage battery 145.

In typical systems, such as the system shown in FIG. 1, the battery charger 125 causes the energy storage system 107 to function as an additional load when charging the one or more high voltage batteries 129. As the GCU 119 may operate independently from the battery charger 125, the added operation of the battery charger 125 may cause the electrical generation system 101 to operate unreliably in response to load transients and other operational events. Additionally, an energy storage system 107 with a battery charger 125 increases the size, weight, and cost of the energy storage system 107. Accordingly, a hybrid electrical system that can operate without a battery charger would be lighter, smaller, and cheaper while also enabling more reliable performance of the hybrid electrical system.

Figure 2:
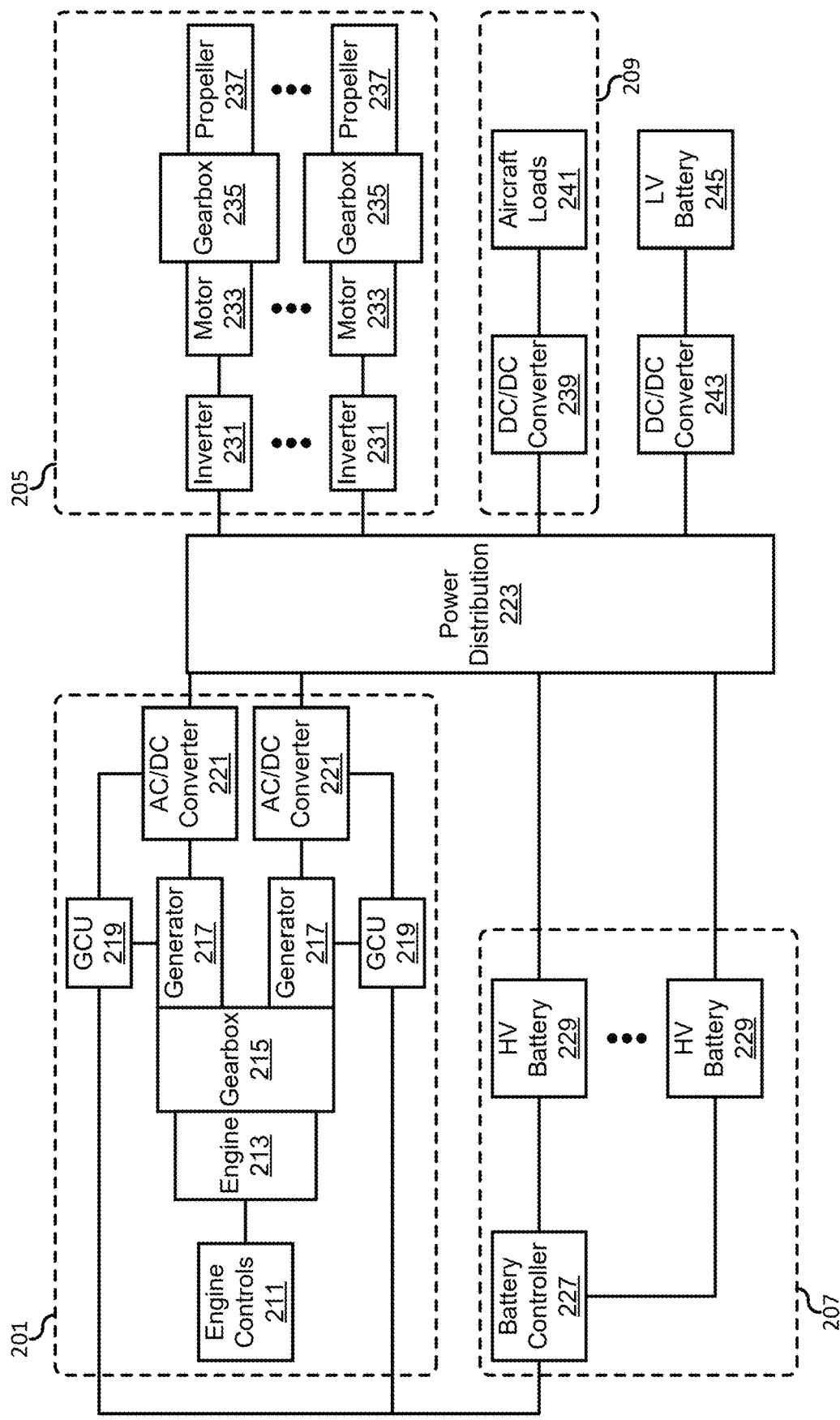
FIG. 2 is a block diagram of a hybrid electrical system according to an aspect of the present disclosure.

FIG. 2 is a block diagram of a hybrid electrical system 200 that provides power from an electrical generation system 201 and an energy storage system 207 to one or more loads through a power distribution system 223. As shown, the AC loads 205, DC loads 209, power distribution system 223, and low voltage batteries 245 function substantially as described above in connection to the AC loads 105, DC loads 109, power distribution system 123, and low-voltage batteries 145. However, the energy storage system 207 operates without a dedicated battery charger like the battery charger 125 in FIG. 1. Also, the electrical generation system 201 communicates with the energy storage system 207 to regulate the power provided by the electrical generation system 201 based on parameters of the energy storage system 207.

As shown, the electrical generation system 201 includes several similar components that function substantially as described above in FIG. 1. For example, the engine controls 211, engine 213, gearbox 215, generators 217, and AC/DC converters 221 respectively function similar to the engine controls 111, engine 113, gearbox 115, generators 117, and DC converters 121 in FIG. 1. However, in contrast to the electrical generation system 101 in FIG. 1, the GCU 219 of the electrical generation system 201 additionally monitors parameters of the energy storage system 207 and controls the operation of the hybrid electrical system 200 based on the monitored parameters.

In certain embodiments, the energy storage system 207 may include energy storage devices like the high voltage batteries 229 that function substantially similar to the one or more high voltage batteries 129 described above in FIG. 1. For example, the high voltage batteries 229 may store electrical power and provide high voltage power to the loads through the power distribution system 223. Further, when connected to the loads, the high voltage batteries 229 may provide the power to the loads based on the power needs of the loads that are not being met by the electrical generation system 201

In some embodiments, the energy storage system 207 may include a battery controller 227. The battery controller 227 may include the functionality of the battery controller 127 described above in connection with FIG. 1. Further, the battery controller 227 may monitor the operation of the high voltage batteries 229 and communicate with the GCU 219 in the electrical generation system 201 or some other controller (not shown) that coordinates the operation of the electrical generation system 201 with the energy storage system 207.

When communicating with the electrical generation system 201, the battery controller 227 may transmit battery parameters to the GCU 219 or another controller. The parameters may include information about the SOC, cold cranking amperes level, a state of health, state of function, open circuit voltage, charge acceptance, current temperature, the current being drawn from the battery, the maximum charge of the battery, present voltage, battery capacity, and other information. The battery controller 227 may use various processes to acquire the information from the operation of the high voltage batteries 229, such as using sensors to monitor the currents, voltages, and temperature of the high voltage batteries 229 over time.

In some embodiments, after acquiring the battery parameters, the battery controller 227 may transmit the parameters periodically to the GCU 219 or other controller. Additionally, the battery controller 227 may transmit some or all of the battery parameters to the GCU 219 or other controller in response to a request from the GCU 219 or other controller. For example, the GCU 219 may request the current SOC of the high voltage batteries 229 from the battery controller 227, whereupon, the battery controller 227 may transmit the SOC to the GCU 219. Further, the battery controller 227 may transmit some or all of the battery parameters in response to certain threshold events that may arise during the operation of the high voltage batteries 229. For example, if the SOC falls below a particular threshold level, the battery controller 227 may notify the GCU 219 or other controller of the threshold event.

In additional embodiments, the battery controller 227 may control the operation of the high voltage batteries 229 based on instructions received from the GCU 219 or other controller. For example, the GCU 219 may direct the battery controller 227 to disconnect or connect the high voltage batteries 229 from the power distribution system 223.

In alternative embodiments, the energy storage system 207 may not include a battery controller 227. In such an embodiment, the GCU 219 or other controller may directly monitor the operation of the high voltage batteries 229 and derive the desired parameters from acquired measurements of the operation of the high voltage batteries 229. Also, the GCU 219 or other controller may send control messages to the high voltage batteries 229 and the energy storage system 207. For example, the GCU 219 may direct the energy storage system 207 to disconnect the energy storage system 207 from the power distribution system 223.

Additionally, the GCU 219, like the GCU 119 in FIG. 1, may regulate the AC voltage. However, the GCU 219 may additionally be able to regulate the generator based on the DC voltage produced by the DC converters 221. Accordingly, the electrical generation system 201 may include an AC POR and a DC POR. The regulation of the voltage using both an AC POR and a DC POR is described in greater detail in the U.S. patent application having Ser. No. 17/586,512, titled "VOLTAGE REGULATION OF HIGH VOLTAGE DIRECT CURRENT SYSTEMS," filed on Jan. 27, 2022, which is hereby incorporated in its entirety by reference. Additionally, the GCU 219 may also regulate the operation of the electrical generation system 201 based on the power generated by the electrical generation system 201 or current flow through the electrical generation system 201 to the loads.

In certain embodiments, when the GCU 219 receives parameters from the energy storage system 207, the GCU 219 may analyze the parameters to determine an operational mode for the hybrid electrical system 200. For example, based on the indicated SOC in the received parameters, the GCU 219 may determine an operational mode for the hybrid electrical system 200. In some implementations, the modes may include a startup mode, normal mode, low-charge mode, high-charge mode, and the like.

In certain embodiments, the startup mode occurs when the hybrid electrical system 200 begins operation or when the hybrid electrical system 200 transitions from a loaded-steady state to a no-load/light-load state. In this mode, the hybrid electrical system 200 may begin generator voltage buildup and start providing power under no-load or light-load conditions with AC POR type regulation.

In exemplary embodiments, the hybrid electrical system 200 begins voltage buildup and starts providing power when the generator 217 is ready to provide the power after turning on the GCU 219. Additionally, the GCU 219 may monitor the voltage produced by the energy storage system 207. The GCU 219 may regulate the HVDC produced by the electrical generation system 201 at an AC POR until the HVDC produced by the electrical generation system 201 reaches the monitored voltage produced by the energy storage system 207. When the HVDC equivalent voltage at the terminals of the generators 217 reaches the monitored voltage of the energy storage system 207, the GCU 219 may close an HVDC contactor between the energy storage system 207 and the generators 217 to reduce an inrush of current.

In further embodiments, when the GCU 219 detects the no-load/light-load during a voltage buildup or steady-state operation or load transient, the GCU 219 may regulate the HVDC produced by the electrical generation system 201 to the monitored voltage produced by the energy storage system 207 with an AC POR voltage regulation method. Additionally, the GCU 219 may switch from regulating the voltage produced by the generators 217 at the AC POR to regulating the voltage produced by the generators 217 at the DC POR.

In further embodiments, the GCU 219 may also determine whether the hybrid electrical system 200 should operate in a normal operation mode. To determine whether the hybrid electrical system 200 should operate in a normal operation mode, the GCU 219 may determine that the parameters of the energy storage system 207 are within a normal operation range. For example, the GCU 219 may monitor the SOC of the high voltage batteries 229 within the energy storage system 207 and determine that the hybrid electrical system 200 is in a normal operation mode when the SOC is within a normal operation range. In one illustrative implementation, when the SOC of the high voltage batteries 229 is within the 20-80%, the GCU 219 determines that the hybrid electrical system 200 should operate in the normal operation mode. While 20-80% is described, other potential ranges for the SOC of the high voltage batteries 229 or other ranges associated with other parameters described above may indicate to the GCU 219 that the hybrid electrical system 200 should operate in the normal operation mode.

In certain implementations, when the hybrid electrical system 200 operates in the normal operation mode, the GCU 219 may cause the electrical generation system 201 to slowly respond to changes in the power needs of the connected loads. For example, the GCU 219 may regulate the excitation of the electrical generation system by monitoring the power or current needs of the loads and smoothing the response of the electrical generation system 201 to changes in the needs of the loads. For example, the GCU 219 may execute an algorithm that smooths measurements of the power needs of the loads. Alternatively, the measurements may be passed through a low pass filter before being received by the GCU 219.

In an exemplary embodiment, the GCU 219 may change the power provided by the electrical generation system 201 at a particular rate. Accordingly, the GCU 219 may check whether the power needs are greater than the current power being provided by the electrical generation system 201. If the power needs are greater, then the GCU 219 begins increasing the power provided by the electrical generation system 201 at a particular rate until the power provided by the electrical generation system 201 is greater than or equal to the power needs of the loads. If the power needs of the loads are less, then the GCU 219 begins to decrease the power provided by the electrical generation system 201 at a particular rate until the power provided by the electrical generation system 201 is less than or equal to the power needs of the loads. In some implementations, the rate is predefined. In alternative embodiments, the rate may vary depending on the capabilities of the electrical generation system 201, the difference between the power needs of the loads and the power provided by the electrical generation system 201, the maximum power provided by the energy storage system 207, and the like.

As the measurements of the power needs are smoothed, the electrical generation system 201 may not respond immediately to the high-frequency transients in the power needs of the loads. Accordingly, when a high-frequency change in the power needs of the loads causes the loads to need more power than what is currently being provided by the electrical generation system, the loads draw the needed additional power from the energy storage system 207 while the power provided by the electrical generation system 201 gradually increases until the electrical generation system 201 is providing sufficient power to meet the power needs of the loads. Conversely, when a high-frequency change causes the loads to need less power than what is currently being provided by the electrical generation system 201, the additional power provided by the electrical generation system 201 may be gradually decreased until the electrical generation system 201 is providing sufficiently the same power as that consumed by the loads.

Thus, when the hybrid electrical system 200 operates in the normal operation mode and the loads have varying power needs, the hybrid electrical system 200 may switch between a first state, where the hybrid electrical system 200 provides power to the loads from a combination of the electrical generation system 201 and the energy storage system 207, and a second state, where the electrical generation system 201 provides power to the loads and additional power for charging the energy storage system 207. Thus, the hybrid electrical system 200 may alternate between states that both discharge and recharge the energy storage system 207, which may cause the energy storage system 207 to stay within the normal operation mode when the hybrid electrical system 200 is substantially within the first state and the second states for equal amounts of time or when the energy storage system 207 is discharged in the first state by a similar amount of power as is provided to the energy storage system 207 in the second state. Additionally, as the electrical generation system 201 smooths the measurements of the power needs of the loads, the electrical generation system 201 may be less sensitive to load transients. Thus, in the normal operation mode, the hybrid electrical system 200 does not need a battery charger, saving money on size, weight, cost, and complexity, while increasing the reliability of the electrical generation system 201 in response to load transients.

Additionally, when operating in the normal operation mode, the GCU 219 may control the POR when the electrical generation system 201 experiences no-load or a light load. For example, when the electrical generation system 201 transitions from a load-on to a light load or no-load, the GCU 219 may switch the POR from an DC POR to a AC POR, where the GCU 219 regulates the voltage. Conversely, when the electrical generation system 201 transitions from a light load or no-load to a load-on to a load-on, the GCU 219 may switch the POR from a AC POR to an DC POR, where the GCU 219 regulates the power or current.

In additional embodiments, the GCU 219 may also determine whether the hybrid electrical system 200 should operate in a low-charge mode. To determine whether or not the hybrid electrical system 200 should operate in the low-charge mode, the GCU 219 may determine when the SOC for the high voltage batteries 229 is below a low-charge threshold level. For example, the low-charge threshold level may be set to an SOC of 20%, though other SOC levels or parameters may be used as well. When the hybrid electrical system 200 operates in a low-charge mode, the GCU 219 may also monitor the SOC to determine when the SOC is greater than the low-charge threshold level. When the SOC exceeds the low-charge threshold level, the GCU 219 may direct the hybrid electrical system 200 to operate in the normal operation mode.

In some embodiments, the GCU 219 may monitor for different threshold values for the low-charge threshold value when the hybrid electrical system 200 is in the low-charge mode as compared to the normal operation mode. For example, when in the normal operation mode, the GCU 219 may use a low-charge entry threshold value, and, when in the low-charge mode, the GCU 219 may use a low-charge exit threshold value. The low-charge entry threshold value may be lower than the low-charge exit threshold value. In one specific example, the low-charge entry threshold value may be 18%, and the low-charge exit threshold value may be 22%. Thus, when operating in the normal operation mode, if the SOC falls below 18%, the GCU 219 may direct the hybrid electrical system 200 to begin operating in the low-charge mode. Once in the low-charge mode, the GCU 219 may direct the hybrid electrical system 200 to operate in the low-charge mode until the SOC exceeds the low-charge exit threshold value. For example, once the SOC exceeds 22%, the GCU 219 directs the hybrid electrical system 200 to operate in the normal operation mode. By using different entry and exit threshold values for the low-charge mode, the hybrid electrical system 200 may avoid situations where the hybrid electrical system 200 repeatedly flips between the low-charge and normal operation modes.

In exemplary embodiments, when operating in the low-charge mode, the GCU 219 may disconnect the energy storage system 207 from providing power to the loads and direct the electrical generation system to provide charging power in addition to the power drawn by the load. In some implementations, the GCU 219 may direct the electrical generation system 201 to operate at an associated power limit. Thus, when the loads are drawing less power than what is provided by the electrical generation system 201, the excess power is used to charge the high voltage batteries 229 in the energy storage system 207. Accordingly, the high voltage batteries 229 may charge to levels that enable the hybrid electrical system 200 to operate within the normal operation mode.

In further embodiments, when operating within the low-charge mode, the power needs of the loads may exceed the power limit of the electrical generation system 201. When the power needs of the loads exceed the power limit of the electrical generation system 201, the GCU 219 may direct the energy storage system 207 to disconnect from the power distribution system 223. When the power needs of the loads fall below the power limit of the electrical generation system 200, the GCU 219 may reconnect the energy storage system 207 to the power distribution system 223. By disconnecting the energy storage system 207 from the power distribution system 223 when the power needs of the loads exceed the power limits of the electrical generation system 201, the hybrid electrical system 200 is able to prevent the loads from drawing power from the energy storage system 207 when the high voltage batteries 229 are at a low SOC.

In certain embodiments, the GCU 219 may monitor the SOC to determine when the hybrid electrical system 200 should operate in a high-charge mode. To determine whether or not the hybrid electrical system 200 should operate in the high-charge mode, the GCU 219 may determine that the SOC for the high voltage batteries 229 is above a high-charge threshold level. For example, the high-charge threshold level may be set to a SOC of 80%, though other SOC levels or parameters may be used as well. When the hybrid electrical system 200 operates in a high-charge mode, the GCU 219 may also monitor the SOC to determine when the SOC is less than the high-charge threshold level. When the SOC is less than the high-charge threshold level, the GCU 219 may direct the hybrid electrical system 200 to operate in the normal operation mode.

In some embodiments, the GCU 219 may monitor for different threshold values for the high-charge threshold value when in the high-charge mode as compared to the normal operation mode. For example, when in the normal operation mode, the GCU 219 may use a high-charge entry threshold value, and, when in the high-charge mode, the GCU 219 may use a high-charge exit threshold value. The high-charge entry threshold value may be higher than the high-charge exit threshold value. In one specific example, the high-charge entry threshold value may be 82%, and the high-charge exit threshold value may be 78%. Thus, when operating in the normal operation mode, if the SOC rises above 82%, the GCU 219 may direct the hybrid electrical system 200 to begin operating in the high-charge mode. Once in the high-charge mode, the GCU 219 may direct the hybrid electrical system 200 to operate in the high-charge mode until the SOC decreases below the high-charge exit threshold value. For example, once the SOC is below 78%, the GCU 219 directs the hybrid electrical system 200 to operate in the normal operation mode. By using different entry and exit threshold values for the low-charge mode, the hybrid electrical system 200 may avoid situations where the hybrid electrical system 200 repeatedly flips between the high-charge and normal operation modes.

In certain embodiments, when operating in the high-charge mode, the GCU 219 or other controller may direct the energy storage system 207 to continuously discharge power at a set discharge power level in addition to the power produced by the electrical generation system 201 to meet the power needs of the loads. Further, the power provided by the electrical generation system 201 may be substantially equal to the power needs of the loads minus the set discharge power level. As the energy storage system 207 continuously discharges at a max discharge rate and the power provided by the electrical generation system 201 is controlled to be less than the power needs of the loads, the high voltage batteries 229 will receive little to no charge while discharging continuously. Thus, while in the high-charge mode, the SOC of the high voltage batteries 229 may decrease until the SOC is less than a high-charge threshold value.

Figure 3:
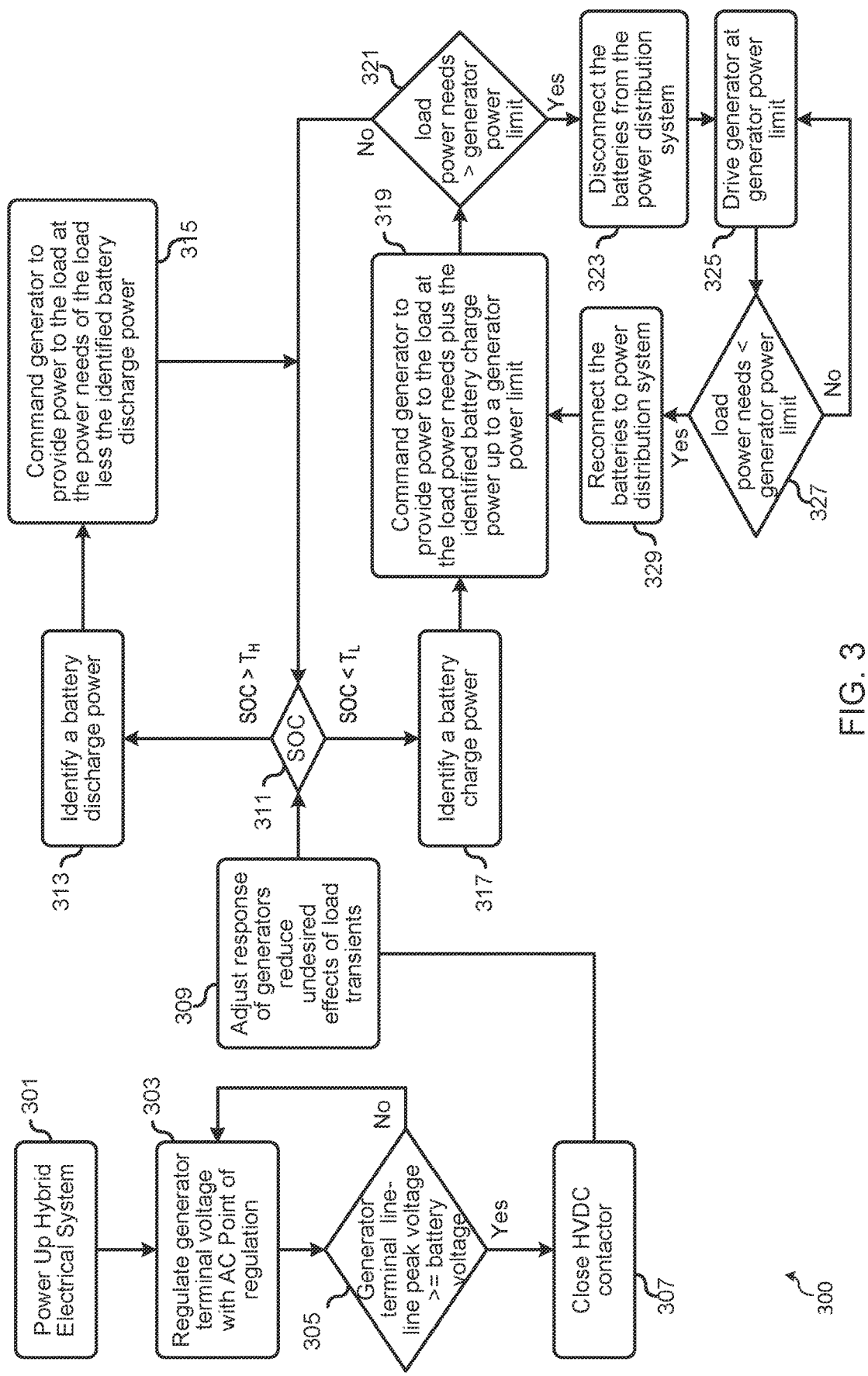
FIG. 3 is a flowchart diagram for controlling the operation of the hybrid electrical system in the power-up mode according to an aspect of the present disclosure.

FIG. 3 is a flowchart diagram illustrating a method 300 for the operation of the hybrid electrical system 200. The method 300 may be performed by the GCU 219, another controller, or combinations of controllers and the GCU 219 within the hybrid electrical system 200 or in communication with the hybrid electrical system 200. As shown, the method 300 proceeds at 301, where the hybrid electrical system 200 is powered up. When the hybrid electrical system 200 is powered up, the method 300 proceeds to 303, where the generator terminal voltage is regulated with an AC POR. For example, upon startup, the GCU 219 may regulate the AC power produced by a generator by monitoring the terminal voltage of the generators 217. The method proceeds at 305, where the GCU 219 determines whether the generator terminal line-line peak voltage is greater than or equal to the battery voltage. For example, while the GCU 219 regulates the operation of the generators 217 from an AC POR, the GCU 219 may compare the generator terminal line-line peak voltage against the battery voltage. If the generator terminal line-line peak voltage is substantially equal to the battery voltage or just slightly greater than, the method 300 may return to 303, where the GCU 219 continues to regulate the generator terminal voltage with an AC POR. However, if the generator terminal line-line peak voltage is equal to or greater than the battery voltage, the method 300 proceeds at 307, where an HVDC contactor is closed to prevent an inrush of current from the generators 217 to the high voltage batteries 229 and cause the electrical generation system 201 and the energy storage system 207 to provide power to the loads in parallel through the power distribution system 223.

In certain embodiments, when the HVDC contactor is closed, the method 300 proceeds at 309, where a response of the generators is adjusted to reduce undesired effects of load transients. For example, the response of the generators to load transients may be slowed. For example, the GCU 219, operating in a normal operation mode, may direct the generators 217 to slowly change the amount of power generated in response to high-frequency changes in the load power needs. While the GCU 219 is slowing the response of the generators 217 to changes in the load power needs, the method 300 may proceed at 311, where the GCU 219 monitors the SOC of the high voltage batteries 229. For example, the GCU 219 may compare the SOC against a high-charge threshold $T_H$ and a low-charge threshold $T_L$. If the SOC is above the high-charge threshold, the GCU 219 moves into the high-charge mode. Conversely, if the SOC is below the low-charge threshold, the GCU 219 moves into the low-charge mode.

In some implementations, when the GCU 219 operates in the high-charge mode, the method 300 proceeds at 313, where a battery discharge power is identified. For example, the GCU 219 may determine that the high voltage batteries 229 should discharge at a maximum battery discharge rate. However, the GCU 219 may change the battery discharge rate based on the power needs of the loads. For example, if the maximum battery discharge rate exceeds the load power needs, the GCU 219 may decrease the discharge rate of the battery accordingly. After identifying the battery discharge power, the method 300 proceeds at 315, where the generator is commanded to provide power to the load at the power needs of the load less the identified battery discharge power. Thus, the high voltage batteries 229 may provide power to cover the difference between the generated power from the generators 217 and the load power needs. Accordingly, the SOC of the high voltage batteries 229 will decrease. While the high voltage batteries 229 are discharging, the method 300 may return to 311 to determine when the SOC is below the high-charge threshold. When the SOC falls below the high-charge threshold, the GCU 219 resumes operating in the normal operation mode.

In additional embodiments, when the GCU 219 operates in the low-charge mode, the method 300 proceeds at 317, where a battery charge power is identified. For example, the GCU 219 may identify the battery charge power as the difference between the slowed response of the generators 217 to the load power needs and a power limit for the generators 217. Further, the method 300 proceeds at 319, where the generator is commanded to provide power to the load at the load power needs plus the identified battery charge power up to a generator power limit. Accordingly, the generators 217 may be providing more power than is used by the loads. The excess generated power may be provided to the batteries to charge the batteries.

Further, when operating in the low-charge mode, the method 300 proceeds at 321, where the GCU 219 checks whether the load power needs are greater than the generator power limit. If the load power needs are greater than the generator power limit, the GCU 219 may proceed at 323, where the batteries are disconnected from the power distribution system. For example, by disconnecting the high voltage batteries 229 from the power distribution system 223 when the load power needs exceed the generator power limit, the loads may be prevented from drawing power from the depleted high voltage batteries 229. Further, the method 300 proceeds at 326, where the GCU 219 checks whether the load power needs are less than the generator power limit. If the load power needs still exceed the generator power limit, the method 300 returns to 325. However, if the load power needs are less than the generator power limit, the method 300 may proceed to 329, where the batteries are reconnected to the power distribution system. When the batteries 229 are reconnected to the power distribution system 223, the method 300 returns to 319. Additionally, while in the low-charge mode, the method 300 may return to 311 to determine when the SOC is above the low-charge threshold. When the SOC rises above the low-charge threshold, the GCU 219 resumes operating in the normal operation mode.

Figure 4A:
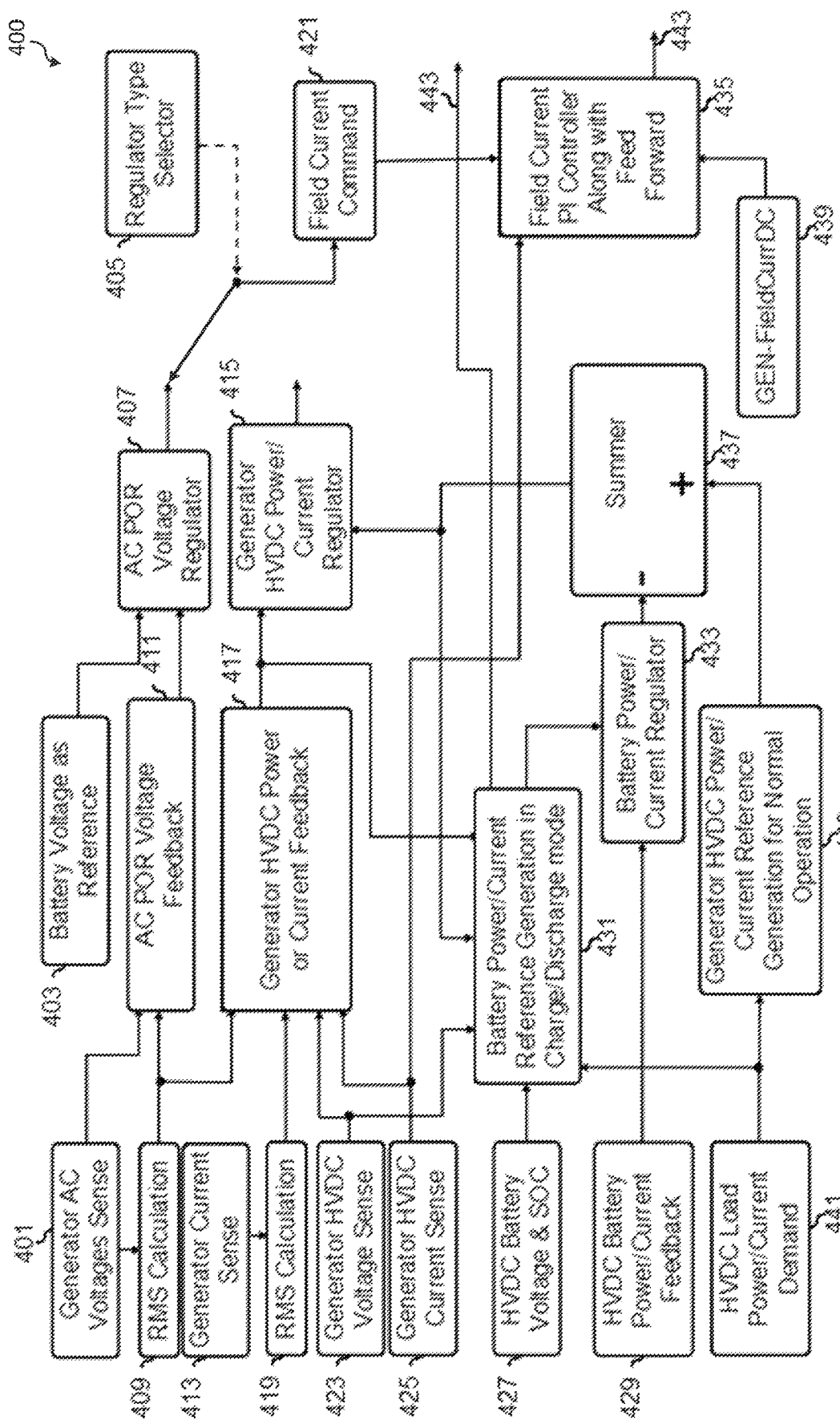
FIGS. 4A-4D are a series of block diagrams illustrating a system for controlling the operation of the hybrid electrical system in the different operational modes according to an aspect of the present disclosure.
Figure 4B:
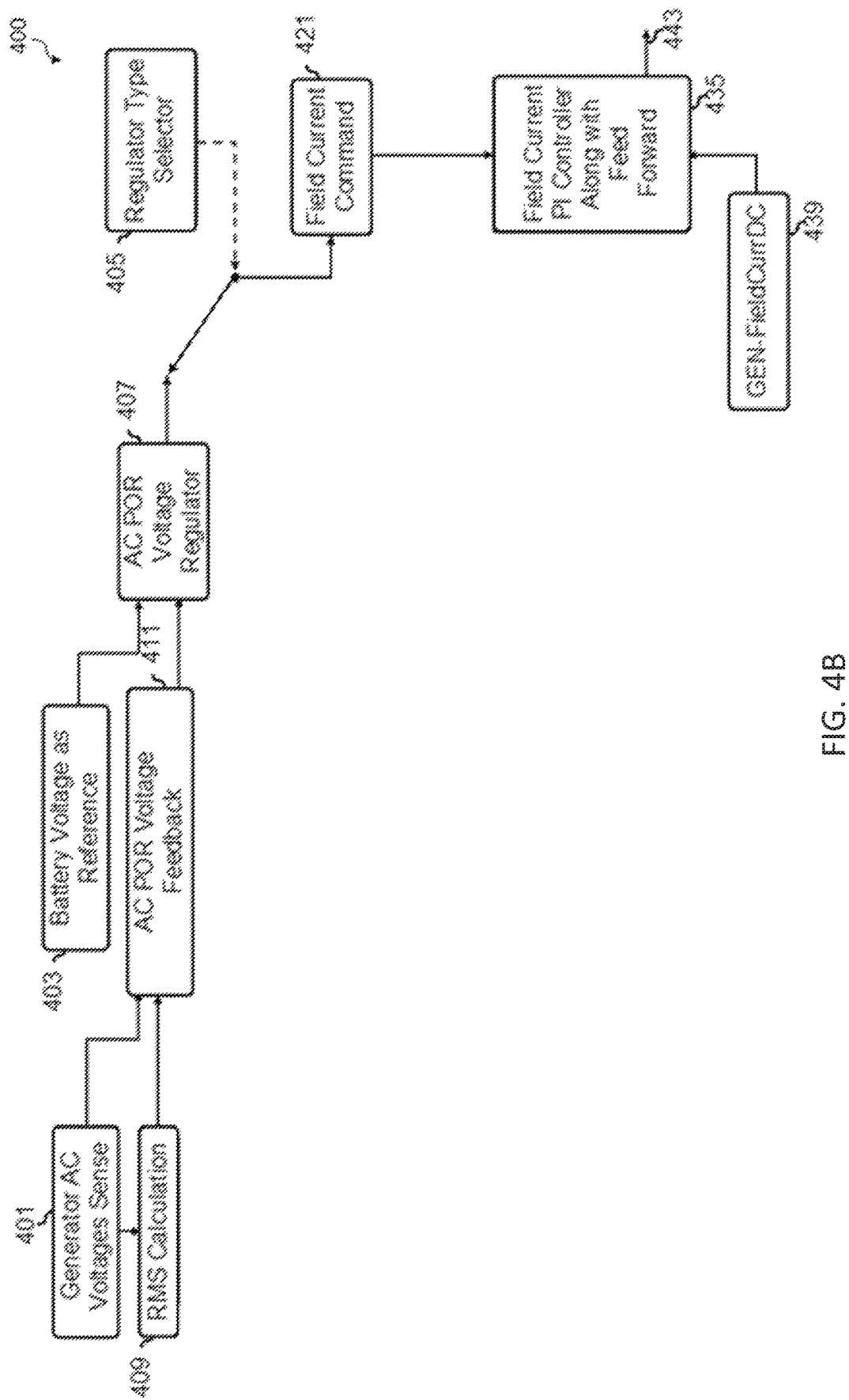
Figure 4C:
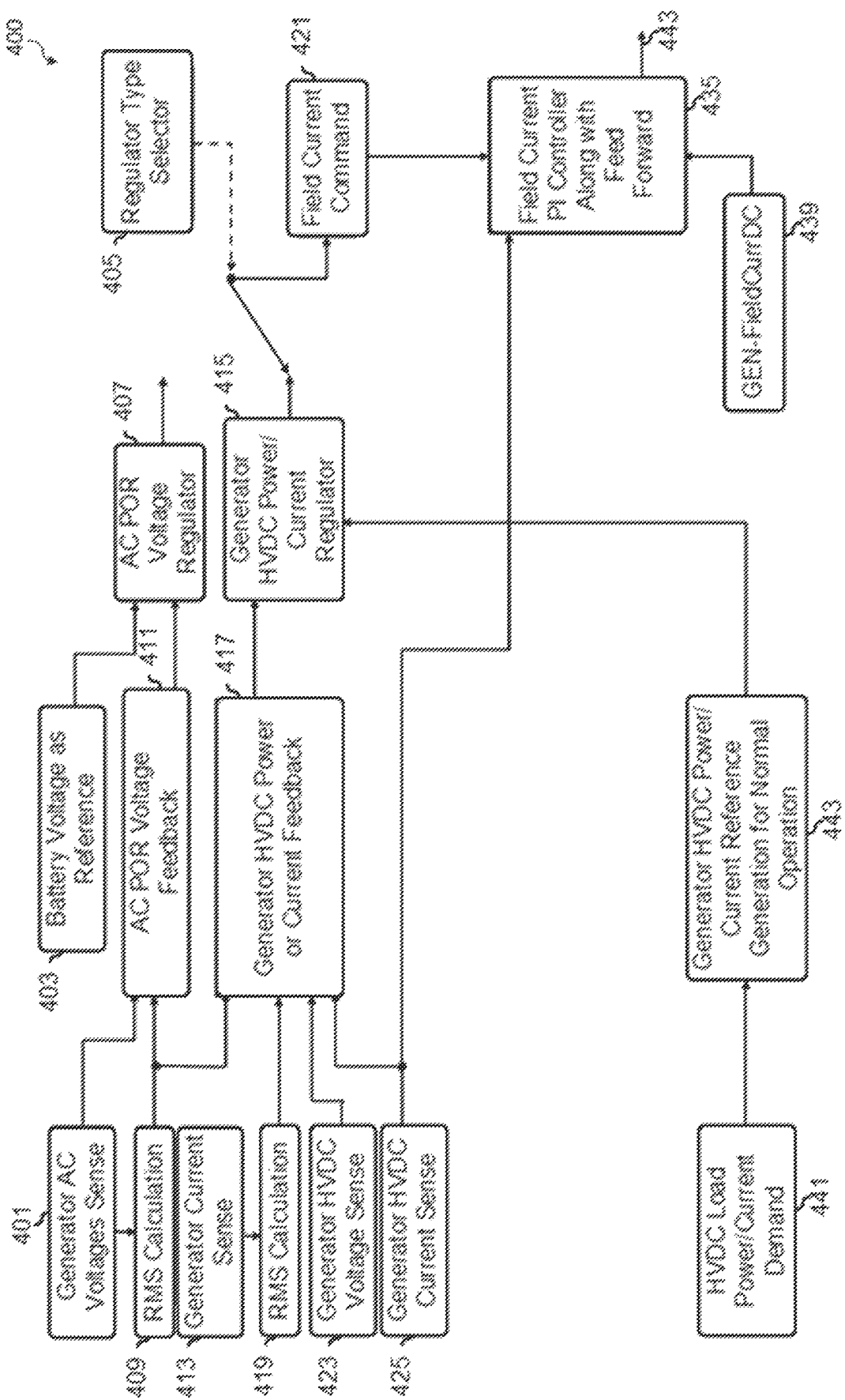
Figure 4D:
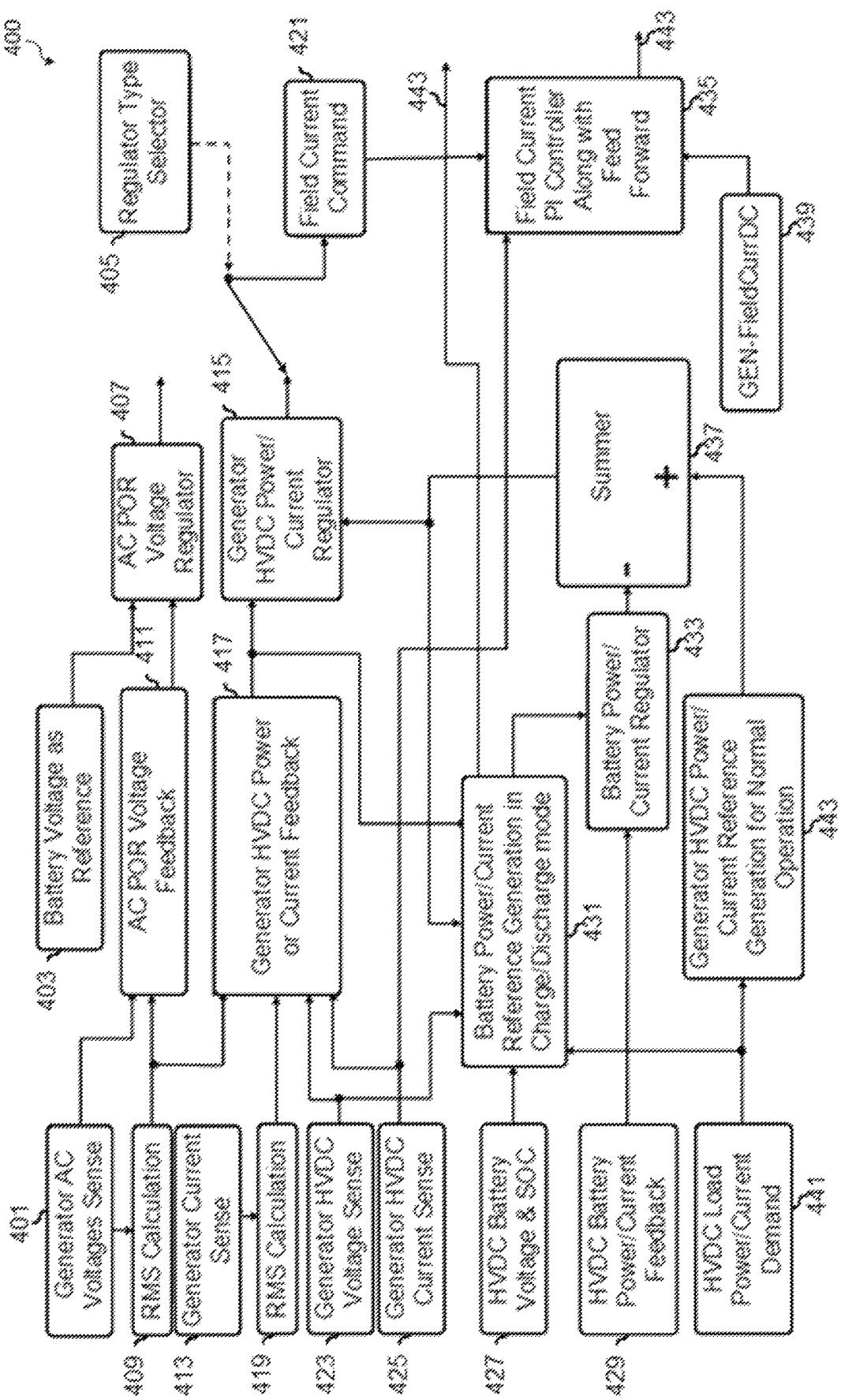

FIGS. 4A-4D are block diagrams illustrating an exemplary embodiment of a system 400 for controlling the operation of a hybrid electrical system 200. The various illustrated blocks may be implemented as part of the GCU 219, through distributed components within the hybrid electrical system 200, or by systems external to the hybrid electrical system 200. FIG. 4A illustrates the components of the system 400. FIG. 4B illustrates the components of the system 400 for controlling the hybrid electrical system 200 during the power-up mode. FIG. 4C illustrates the components of the system 400 for controlling the hybrid electrical system 200 during the normal operation mode. FIG. 4D illustrates the components of the system 400 for controlling the hybrid electrical system 200 during the low-charge and high-charge modes.

In certain embodiments, the system 400 receives multiple inputs that are used to control the operation of the hybrid electrical system 200. For example, the system 400 may receive a generator AC voltages sense measurements 401, which measures the AC voltage produced by the generators 217. Also, the system 400 may receive battery voltage measurements 403, which is a measurement of the battery voltage for use as a reference. Additionally, the system 400 may receive a generator current sense measurement 413, which measures the current of the power provided by the generator 217. Further, the system 400 may receive a generator HVDC voltage sense measurement 423, which measures the voltage of the DC power provided by the electrical generation system 201. Also, the system 400 may receive a generator HVDC current sense measurement 425, which measures the current of the DC power provided by the electrical generation system 201. Moreover, the system 400 may receive HVDC battery voltage and SOC measurements 427, which measure the voltage of the power provided by the high voltage batteries 229 and the SOC of the high voltage batteries 229. Additionally, the system 400 may receive HVDC Battery power/current feedback measurements 429, which measure the power and current of the power provided by the high voltage batteries 229. Further, the system 400 may receive HVDC load power/current demand measurements 441, which measure the power needs of loads connected to the power distribution system 223.

In exemplary embodiments, the system 400 includes various components that use the received measurements to control the operation of the hybrid electrical system 200. For example, the system 400 may include an AC POR voltage feedback 411 that combines the generator AC voltages sense measurements 401 and an AC voltages RMS calculation 409 of the generator AC voltages sense measurements 401 for use when performing AC POR. Additionally, the 400 may include an AC POR voltage regulator 407 that regulates the operation of the electrical generation system 201 at an AC POR.

In further embodiments, the system 400 includes a generator HVDC power/current feedback 417 that receives the generator current sense measurement 413, an RMS calculation 419 of the generator current sense measurement 413, the HVDC voltage sense measurement 423, and the current sense measurement 425. The generator HVDC power/current feedback 417 uses the various measurements to provide a power/current feedback signal for use by a generator HVDC power/current regulator 415. The generator HVDC power/current regulator 415 may regulate the power produced by the electrical generation system 201 by regulating at least one of the power and current produced by the generator 217. To control whether the generator operation is regulated by the AC POR voltage regulator 407 or the power/current regulator 415, the system 400 may include a regulator type selector 405.

In some embodiments, the system 400 includes a generator HVDC power/current reference generation for normal operation 443 (referred to hereinafter as the normal operation reference generator 443). The normal operation reference generator 443 may receive the HVDC load power/current demand measurements 441 and generate a generator reference power command that is a slowed response to the HVDC load power/current demand measurements 441. The system 400 also includes a battery power/current reference generation in charge/discharge mode 431 (referred to hereinafter as the battery reference generator 431). The battery reference generator 431 may monitor the HVDC battery voltage and SOC measurements 427 to determine whether the hybrid electrical system 200 should operate in the low-charge or high-charge mode. Based on the mode determination by the battery reference generator 431, the battery reference generator 431 provides a battery reference signal based on the available measurements to a battery power/current regulator 433. The battery power/current regulator 433 provides a signal to a summer 437, which is subtracted from the generator power reference command from the normal operation reference generator 443 to provide the generator power command to the generator HVDC power/current regulator 415. Also, the battery reference generator 431 may provide a battery disconnect/connect signal 443 to the battery based on determinations made by the battery reference generator 431.

In additional embodiments, based on the regulation type by the regulator type selector 405, either the AC POR voltage regulator 407 or the generator HVDC power/current regulator 415 may provide a regulation command to a field current command 421, which generates a field current command for the field current proportional integral controller along with feed forward 435. The field current proportional integral controller along with feed forward 435 may also receive a DC generator filed current 439 and the current sense measurement 425 to generate a generator excitation duty cycle 443. The operation of the field current proportional integral controller along with feed forward 435 is known to one having skill in the art.

FIG. 4B illustrates the components of the system 400 used during the power-up mode. As described above, during the power-up mode, the GCU 219 may use the AC POR voltage regulator 407 to regulate the voltage until the generator line-line peak voltage is equal to or greater than the battery voltage. Accordingly, the AC POR voltage regulator 407 may receive the AC POR voltage feedback 411 representing the generator voltage and the battery voltage measurements 403 and regulate the electrical generation system 201 based on the generator AC POR voltage feedback 411. When the AC POR voltage regulator 407 determines that the AC POR voltage feedback 411 is greater than or equal to the battery voltage measurements 403, the AC POR voltage regulator 407 may disconnect an HVDC contactor and cause the regulator type selector 405 to switch to the generator HVDC power/current regulator 415.

FIG. 4C illustrates the components of the system 400 used during the normal operation mode. As shown, during the normal operation mode, the regulator type selector 405 selects the generator HVDC power/current regulator 415 for regulating the operation of the hybrid electrical system 200. However, the regulator type selector 405 may select the AC POR voltage regulator 407 when the hybrid electrical system 200 experiences a no-load/light load condition. When there is a load on, the generator HVDC power/current regulator 415 may receive generator HVDC power or current feedback 417 and the generator reference power command from the normal operation reference generator 443. As discussed above, the generator reference power command represents a smoothed response to the HVDC load power/current demand measurements 441.

FIG. 4D illustrates the components of the system 400 used during the low-charge and high-charge modes. As shown, during the low-charge mode and high-charge mode, the system 400 uses the battery reference generator 431, the battery power/current regulator 433, and the summer 437 as described above in relation to FIG. 4A. For example, in the low-charge mode, the battery reference generator 431 receives the output from the summer 437 and the HVDC load power/current demand measurements 441. By monitoring the output from the summer 437, the battery reference generator 431 may generate a negative battery reference signal that drives the output of the summer 437 to direct the generator HVDC power/current regulator 415 to drive the generator 217 at a generator power limit. If the HVDC load power/current demand measurements 441 exceeds the generator power limit, the battery reference generator 431 may send a disconnect signal to the high voltage batteries 229 that disconnects the high voltage batteries 229 from the loads. When the hybrid electrical system 200 operates in the high-charge mode, the battery reference generator 431 may provide a positive battery reference signal that is subtracted from the generator reference power command that causes the battery to discharge. The battery reference generator 431 may direct the hybrid electrical system 200 to reenter the normal operation mode when the SOC of the high voltage batteries 229 is within a normal operation range.

In certain embodiments, the algorithms, methods, and systems described herein may be implemented on one or more processors that execute instructions and process data stored on one or more memory units. The one or more processors may be part of a GCU 219, a battery controller 227, or other control device that exists internal to or external from the hybrid electrical system 200. The one or more processors may be implemented using software, firmware, hardware, or other appropriate combinations thereof. The one or more processors may be supplemented by, or incorporated in, specially designed application-specific integrated circuits (ASICs) or field programmable gate arrays (FPGAs). The one or more processors may be a general or special purpose computer or processor or other programmable logic devices. The processor and other computing devices may also include or function with software programs, firmware, or other computer-readable instructions for carrying out various process tasks, calculations, and control functions used in the present methods and systems.

Further, computer-executable instructions (such as program modules or components) may implement the methods described in this description. The one or more processors may execute the computer-executable instructions. Software, firmware, or other execution-capable devices may execute the computer-readable instructions for carrying out various process tasks, calculations, and generation of data used in the operations of the described methods. The computer-readable instructions may be stored as part of one or more appropriate computer-program products, where a computer-program product may be a set of computer-readable instructions or data structures stored on a computer-readable medium. The computer-readable medium may be a media that stores data that the processor or other computing device can access. In certain implementations, the computer-readable medium may form part of a memory unit.

Computer-readable mediums may include non-volatile memory devices. Non-volatile memory devices may include semiconductor memory devices such as random access memory (RAM), read-only memory (ROM), electrically erasable programmable ROM (EEPROM), or flash memory devices. The non-volatile memory devices may also include magnetic disks (such as internal hard disks or removable disks), optical storage devices (such as compact discs (CDs), digital versatile discs (DVDs), Blu-ray discs), or other media that can store computer-executable instructions or data structures.

Figure 5:
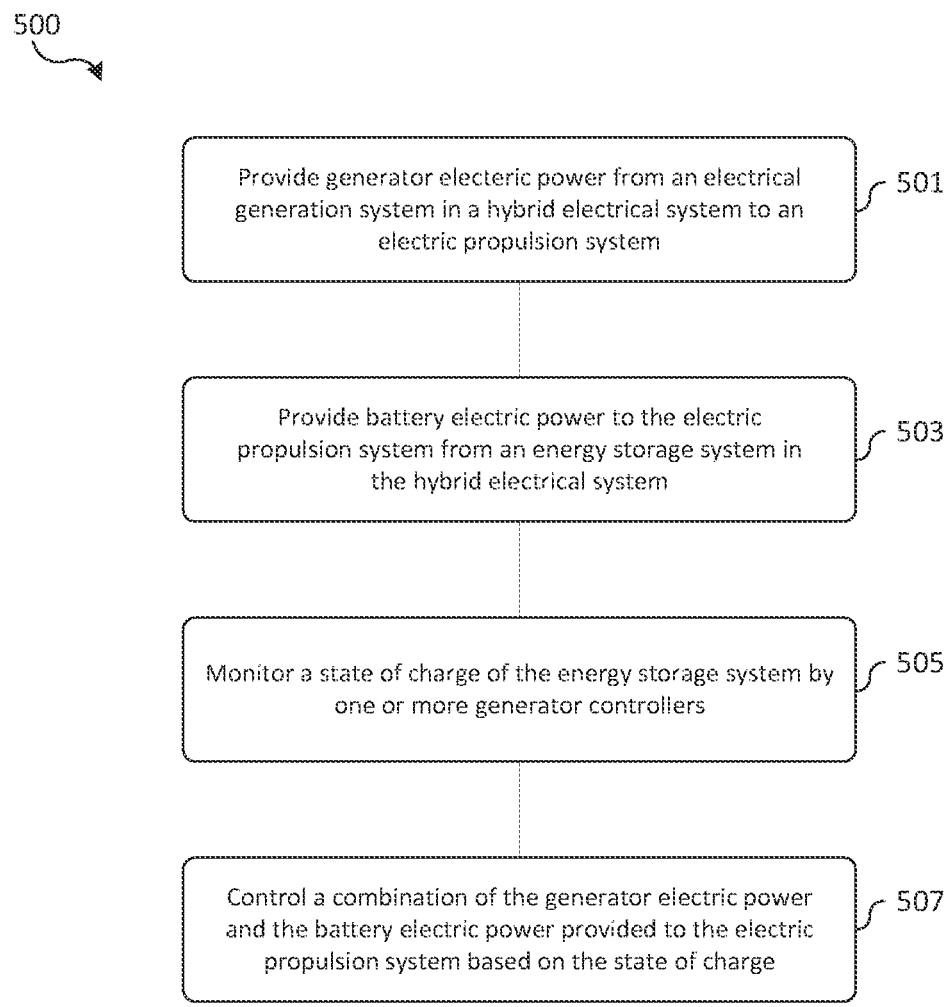
FIG. 5 is a flowchart diagram of a method for controlling the operation of a hybrid electrical system according to an aspect of the present disclosure.

FIG. 5 depicts a flow diagram illustrating an exemplary method 500 for providing energy management of hybrid electrical systems. The method 500 may be implemented via the techniques described with respect to FIGS. 2-4D, but may be implemented using other techniques known to one having skill in the art. The blocks of the flow diagram have been arranged in a generally sequential manner to facilitate explanation. But, the arrangement of the blocks is merely exemplary, and the blocks can be arranged in any manner sufficient to provide the functionality described above with respect to FIGS. 2-4D. For example, a processor may perform steps in different orders, in parallel, or as shown.

As shown in FIG. 5, the method 500 proceeds at 501, where a generator provides power from an electrical generation system in a hybrid electrical system to an electric propulsion system. For example, as described above, one or more generators 217 may generate power that is provided to an electric propulsion system 205 through a power distribution system 223. Further, the method 500 proceeds at 503, where battery electric power is provided to the electric propulsion system from an energy storage system in the hybrid electrical system. For example, one or more high voltage batteries 229 may provide power to the electric propulsion system 205 through the power distribution system 223.

In certain embodiments, the method 500 proceeds at 505, where a state of charge of the energy storage system is monitored by one or more generator controllers. For example, one or more GCUs 219 in the electrical generation system 201 may monitor the SOC of the high voltage batteries 229 in the energy storage system 207. Further, the method 500 proceeds at 507, where a combination of the generator electric power and the battery electric power provided to the electric propulsion system based on the state of charge. For example, the GCUs 219 may determine a particular mode of operation for the hybrid electrical system 200 based on the SOC of the high voltage batteries 229 in the energy storage system 207. Based on the determined mode of operation, the GCUs 219 may implement mode specific schemes for combining the battery electric power and the generator electric power provided to the electric propulsion system 205.

EXAMPLE EMBODIMENTS

Example 1 includes a system comprising: one or more generators configured to provide generator electric power; one or more batteries configured to provide stored electric power; and one or more generator controllers using a state of charge for the one or more batteries, wherein the one or more generator controllers control a combination of the generator electric power and the stored electric power provided to one or more loads according to a plurality of modes, wherein multiple modes of the plurality of modes are based on one or more parameters of the one or more batteries.

Example 2 includes the system of Example 1, wherein the plurality of modes comprises at least one of: a power-up mode; a normal operation mode; a low-charge mode; and a high-charge mode.

Example 3 includes the system of Example 2, wherein, when a mode in the plurality of modes is the power-up mode, the one or more generator controllers is configured to: regulate the generator voltage at an alternating current point of regulation; and direct a high voltage direct current contact to close when the generator line to line peak voltage provided by the one or more generators is equal to or greater than the voltage of stored provided by the one or more batteries.

Example 4 includes the system of any of Examples 2-3, wherein, when a mode in the plurality of modes is the normal operation mode, the one or more generator controllers is configured to adjust a response of the one or more generators to reduce undesired effects of load transients.

Example 5 includes the system of Example 4, wherein the one or more generator controllers adjusts the response by slowing the response, wherein the one or more generators is configured to slow the response by at least one of: changing the generator electric power provided by the one or more generators at a constant rate towards the power needs of the one or more loads; performing a smoothing algorithm on data representing the power needs of the one or more loads;

and passing a signal representing the power needs of the one or more loads through a low pass filter.

Example 6 includes the system of any of Examples 2-5, wherein, when a mode in the plurality of modes is the normal operation mode, a portion of the provided generator electric power charges the one or more batteries when load power required for the one or more loads decreases, and the one or more batteries provide the stored electric power when the required load power increases.

Example 7 includes the system of any of Examples 2-6, wherein, when a mode in the plurality of modes is the low-charge mode, the one or more generator controllers is configured to command the one or more generators to operate up to an upper power limit.

Example 8 includes the system of Example 7, wherein, when the mode is the low-charge mode, the one or more batteries disconnect from the one or more loads when power needs of the one or more loads exceeds the upper power limit.

Example 9 includes the system of any of Examples 2-8, wherein, when a mode in the plurality of modes is the high-charge mode, the one or more generator controllers is configured to cause the one or more batteries to discharge at a discharge power level.

Example 10 includes the system of Example 9, wherein the one or more generator controllers cause the one or more batteries to discharge at the discharge power level by commanding the generators to provide power according to power needs of the one or more loads minus the discharge power level.

Example 11 includes the system of any of Examples 1-10, wherein the one or more generator controllers comprise one or more generator control units located within an electrical generation system and motion of the one or more generators is driven by a prime mover.

Example 12 includes the system of any of Examples 1-11, wherein at least one load in the one or more loads is an electrical propulsion system.

Example 13 includes the system of any of Examples 1-12, wherein the one or more parameters includes a state of charge for the one or more batteries.

Example 14 includes a method comprising: providing generator electric power from an electrical generation system in a hybrid electrical system to an electric propulsion system; providing battery electric power to the electric propulsion system from an energy storage system in the hybrid electrical system, the energy storage system comprising one or more batteries; monitoring a state of charge of the energy storage system by one or more generator controllers; and controlling a combination of the generator electric power and the battery electric power provided to the electric propulsion system by the one or more generator controllers based on the state of charge of the energy storage system.

Example 15 includes the method of Example 14, wherein monitoring the state of the charge of the energy storage system by the one or more generator controllers further comprises determining that a mode of operation for the hybrid electrical system is at least one of: a power-up mode; a normal operation mode; a low-charge mode; and a high-charge mode.

Example 16 includes the method of any of Examples 14-15, further comprising: determining that the mode of operation is the power up mode; regulating the generator voltage at an alternating current point of regulation; and directing a high voltage direct current contact to close when the generator voltage provided by the electrical generation system reaches the battery voltage provided by the electrical storage system.

Example 17 includes the method of any of Examples 14-16, further comprising: determining that the mode of operation is the normal operation mode; providing power to the battery when the required load power is decreasing; and discharging the battery when the required load power is increasing.

Example 18 includes the method of any of Examples 14-17, further comprising: determining that the mode of operation is the low-charge mode; commanding the electrical generation system to operate up to an upper power limit; and disconnecting the energy storage system from the electric propulsion system when power needs of the electric propulsion system exceed the upper power limit.

Example 19 includes the method of any of Examples 14-18, further comprising: determining that the mode of operation is the high-charge mode; and causing the energy storage system to discharge at a discharge power level by commanding the electrical generation system to provide power according to power needs of the electric propulsion system minus the discharge power level.

Example 20 includes a system comprising: an energy storage system lacking a dedicated battery charger, the energy storage system comprising one or more batteries that provide battery electric power; an electrical generation system, the electrical generation system comprising: one or more generators that provide generator electric power; and one or more generator control units that controls a level of generator electric power using a state of charge for the energy storage system; one or more loads comprising an electric propulsion system; and a power distribution system configured to receive the battery electric power and the generator electric power for distribution to the one or more loads.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

The invention claimed is:

1. A system comprising:
one or more generators configured to provide generator electric power;
one or more batteries configured to provide stored electric power; and
one or more generator control units using a state of charge for the one or more batteries, wherein the one or more generator control units control a combination of the generator electric power and the stored electric power provided to one or more loads according to a plurality of modes, wherein multiple modes of the plurality of modes are based on one or more parameters of the one or more batteries;
wherein the one or more loads comprise one or more electrical motor drives, other on-board electrical loads, or batteries of an electric propulsion system.

2. The system of claim 1, wherein the plurality of modes comprises at least one of:
a power-up mode;
a normal operation mode;
a low-charge mode; and
a high-charge mode.

3. The system of claim 2, wherein, when a mode in the plurality of modes is the power-up mode, the one or more generator control units is configured to:
regulate the generator voltage at an alternating current point of regulation; and
direct a high voltage direct current contact to close when the generator line to line voltage provided by the one or more generators is equal to or greater than the voltage of stored provided by the one or more batteries.

4. The system of claim 2, wherein, when a mode in the plurality of modes is the normal operation mode, the one or more generator control units is configured to adjust a response of the one or more generators to reduce undesired effects of load transients.

5. The system of claim 4, wherein the one or more generator control units adjusts the response by slowing the response, wherein the one or more generators is configured to slow the response by at least one of:
changing the generator electric power provided by the one or more generators at a constant rate towards the power needs of the one or more loads;
performing a smoothing algorithm on data representing the power needs of the one or more loads; and
passing a signal representing the power needs of the one or more loads through a low pass filter.

6. The system of claim 2, wherein, when a mode in the plurality of modes is the normal operation mode, a portion of the provided generator electric power charges the one or more batteries when load power required for the one or more loads decreases, and the one or more batteries provide the stored electric power when the required load power increases.

7. The system of claim 2, wherein, when a mode in the plurality of modes is the low-charge mode, the one or more generator control units is configured to command the one or more generators to operate up to an upper power limit.

8. The system of claim 7, wherein, when the mode is the low-charge mode, the one or more batteries disconnect from the one or more loads when power needs of the one or more loads exceeds the upper power limit.

9. The system of claim 2, wherein, when a mode in the plurality of modes is the high-charge mode, the one or more generator control units is configured to cause the one or more batteries to discharge at a discharge power level.

10. The system of claim 9, wherein the one or more generator control units cause the one or more batteries to discharge at the discharge power level by commanding the generators to provide electric power according to power needs of the one or more loads minus the discharge power level.

11. The system of claim 1, wherein the one or more generator control units are located within an electrical generation system and motion of the one or more generators is driven by a prime mover.

12. The system of claim 1, wherein at least one load in the one or more loads is an electrical propulsion system.

13. The system of claim 1, wherein the one or more parameters includes a state of charge for the one or more batteries.

14. A method comprising:
providing generator electric power from an electrical generation system in a hybrid electrical system to an electric propulsion system comprising at least one electrical motor drive, on-board electrical loads, or battery;
providing battery electric power to the electric propulsion system from an energy storage system in the hybrid electrical system, the energy storage system comprising one or more batteries;
monitoring a state of charge of the energy storage system by one or more generator control units; and
controlling a combination of the generator electric power and the battery electric power provided to the electric propulsion system by the one or more generator control units based on the state of charge of the energy storage system.

15. The method of claim 14, wherein monitoring the state of the charge of the energy storage system by the one or more generator control units further comprises determining that a mode of operation for the hybrid electrical system is at least one of:
a power-up mode;
a normal operation mode;
a low-charge mode; and
a high-charge mode.

16. The method of claim 14, further comprising:
determining that the mode of operation is the power up mode;
regulating the generator voltage at an alternating current point of regulation; and
directing a high voltage direct current contact to close when the generator voltage provided by the electrical generation system reaches the battery voltage provided by the electrical storage system.

17. The method of claim 14, further comprising:
determining that the mode of operation is the normal operation mode;
providing electric power to the battery when the required load power is decreasing; and
discharging the battery when the required load power is increasing.

18. The method of claim 14, further comprising:
determining that the mode of operation is the low-charge mode;
commanding the electrical generation system to operate up to an upper power limit; and
disconnecting the energy storage system from the electric propulsion system when power needs of the electric propulsion system exceed the upper power limit.

19. The method of claim 14, further comprising:
determining that the mode of operation is the high-charge mode; and
causing the energy storage system to discharge at a discharge power level by commanding the electrical generation system to provide electric power according to power needs of the electric propulsion system minus the discharge power level.

20. A system comprising:
an energy storage system lacking a dedicated battery charger, the energy storage system comprising one or more batteries that provide battery electric power;
an electrical generation system, the electrical generation system comprising:
one or more generators that provide generator electric power; and
one or more generator control units that control a level of generator electric power using a state of charge for the energy storage system;
one or more loads comprising an electric propulsion system; and
a power distribution system configured to receive the battery electric power and the generator electric power for distribution to the one or more loads, wherein the one or more loads comprise one or more electrical motor drives, other on-board electrical loads, or batteries of an electric propulsion system.

\* \* \* \* \*